Patented June 14, 1949

2,473,005

UNITED STATES PATENT OFFICE 2,473,005

METHOD AND CATALYSTS FOR POLYMERIZING VINYL AND VINYLIDENE COMPOUNDS

Joseph W. Britton and Robert C. Dosser, Midland, Mich., assignors to The Dow Chemical Company, Midland, Mich., a corporation of Delaware No Drawing. Application August 2, 1943, Serial No. 497,060

2 Claims. (Cl. 260—88)

This invention concerns an improved method of polymerizing vinyl and vinylidene compounds, particularly vinyl halides, and also certain new complex catalysts which are exceptionally effective in promoting the polymerization reactions.

It is known that the polymerization of a vinyl halide, either alone or in an inert medium, is catalyzed by the presence of peroxides. However, even when using such catalyst, the polymerization occurs sluggishly and long periods of time are required in order to obtain commercially practical yields of the polymer. Also, the polymer obtained under such usual polymerization conditions frequently possesses unsatisfactory molding properties or poor strength characteristics. Similar difficulties are frequently encountered in polymerizing other vinyl or vinylidene compounds.

In a copending application, Serial No. 351,220, filed August 3, 1940, and issued June 5, 1945, as Patent No. 2,377,752, of which the present application is a continuation-in-part, we have disclosed that vinyl and vinylidene compounds, and particularly vinyl halides, may be polymerized rapidly by carrying the polymerization out under acidic conditions in the presence of a peroxide and a ferric, chromic, or an aluminum salt. The acid-acting ingredient, the peroxide and the metal salt co-act as a unitary complex catalyst which is far more active in accelerating the polymerization reaction than is any of its individual ingredients. However, said copending application claims only a polymerization process wherein the essential metal salt ingredient of the complex catalyst is a ferric compound. The present application covers such acidic catalyst mixtures comprising chromic or aluminum salts and a polymerization method involving the use of these complex catalysts.

Examples of vinyl and vinylidene compounds which may advantageously be polymerized in the presence of the complex catalysts provided by this invention are methyl acrylate, methyl isopropenyl ketone, vinyl cyanide, vinyl chloride, vinyl bromide, asymmetric dichloro-ethylene, vinyl acetate, etc., as well as mixtures of such polymerizable compounds.

Except for the presence of the complex catalyst, the polymerization reaction may be carried out in any of the usual ways, e. g. en masse, or in aqueous emulsion, or in the presence of an organic solvent capable of serving as a mutual solvent for the polymerizable compound and the complex catalyst. However, the rate of polymerization varies with the different vinyl or vinylidene compounds, depending upon the reaction medium used, i. e. a medium which is satisfactory for the catalytic polymerization of one compound may be poorly adapted to the polymerization of another compound or vice versa. For instance, the polymerization of vinyl cyanide with the complex catalyst occurs rapidly in the presence of aqueous methanol as a reaction medium, but only sluggishly if carried out in aqueous emulsion. In contrast, the polymerization of asym.-dichloroethylene with the complex catalyst occurs rapidly when carried out in aqueous emulsion, but only sluggishly when using aqueous methanol as a reaction medium. Accordingly, care must be taken to employ a medium which does not interfere with the polymerization of the vinyl or vinylidene compound under treatment. For this reason, the description will, from this point on, be directed particularly to the polymerization of vinyl halides, it being understood that the complex catalysts disclosed are effective, when used together with a suitable medium, in polymerizing other vinyl and vinylidene compounds.

We have found that the polymerization of a vinyl halide in the presence of peroxides may be further accelerated by also having present a chromic or an aluminum salt and sufficient of an acid-acting substance to render the reaction mixture acidic, e. g. to bring it to a pH value below 6 and preferably between 1 and 3. Examples of chromic and aluminum salts which may be used in the process are the metal chlorides, sulphates, nitrates, acetates, etc. By "salts" of chromium or aluminum, we refer to ionizable compounds of these metals, wherein the positive metal ion is attached directly to an acid radical. The metal salt need not be added as such to the reaction mixture, but may be formed in situ within the mixture, e. g. by the reaction of an acid on an oxide of the metal. If desired, the complex catalyst may comprise a mixture of chromic and aluminum salts together with one another or together with a ferric salt.

Examples of acids which may be used as the acid-acting ingredient of the complex catalyst are nitric acid, hydrochloric acid, sulphuric acid, acetic acid, chloroacetic acid, etc. A mineral acid is preferably used. In place of an acid, any acid-acting substance capable of rendering the mixture sufficiently acidic may be used. For instance, when carrying the polymerization out in the presence of water and aluminum chloride or aluminum nitrate, etc., the metal salt often is hydrolyzed to a sufficient extent to bring the mixture to the preferred pH value of between 1 and 3, in which case an acid need not be added as such to the mixture. Also, when polymerizing a vinyl halide in the presence of water a slight amount of acid sometimes is formed due to hydrolysis of a small portion of the vinyl halide. The amount of acid formed due to such hydrolysis of the vinyl halide is small and usually insufficient to bring the mixture to the preferred pH value. In any instance, the reaction mixture should contain sufficient of an acid-acting substance to render it definitely acidic, and preferably of pH value between 1 and 3. It should be mentioned that the activity of the complex catalyst appears to decrease when the pH value of the reaction mixture is reduced below 1; hence, that the use of an excess of acid over the amount required to obtain the preferred pH range of from 1 to 3 is advantageously avoided. In most instances, the catalyst exhibits its maximum activity at pH values between 1.8 and 2.8, and the acidic ingredient is usually employed in amount such as to give the reaction mixture a pH value within this range. It is our belief that the decrease in polymerization rate which occurs when a reaction mixture is rendered too acidic is not due to an actual decrease in the activity of the catalyst, but instead, is due to separation of the polymerizable compound and one or more of the ingredients of the catalyst into distinct phases. However, the invention is not limited by any theory as to the reason for the results herein reported.

Hydrogen peroxide is preferably employed as the peroxide ingredient of the complex catalyst, but other peroxides such as sodium peroxide, barium peroxide, ammonium persulphate, sodium persulphate, potassium persulphate, or benzoyl peroxide, etc., may be used. The peroxide is usually employed in amount corresponding to between 0.002 and 0.2 of the molecular equivalent of the compound to be polymerized.

The chromium or aluminum salt is usually employed in a proportion such as to contain between 0.0005 and 0.05 gram atomic weight of the metal, i. e. chromium or aluminum, per gram mole of the vinyl halide reactant. However, the proportion of the metal salt may be varied widely, provided sufficient peroxide is present to co-act with the same as a catalyst for the polymerization reaction. A large excess of the peroxide may be used if desired. However, the employment of an excess of the metal salt, over the amount which will co-act catalytically with the peroxide, may result in the polymerization reaction becoming sluggish, or ceasing, before it is completed. When using 0.005 gram mole of hydrogen peroxide per gram mole of vinyl chloride in polymerizing the latter and carrying the reaction out under acid conditions, the proportion of an aluminum salt used as a catalyst ingredient may advantageously correspond to between 0.0005 and 0.04 gram atomic weight of aluminum per mole of the vinyl chloride or, alternatively, the proportion of a chromium salt used as such ingredient may correspond to between 0.0005 and 0.02 gram atomic weight of chromium per gram mole of the vinyl chloride. The use of a larger proportion of the aluminum or chromium salt together with the amount of hydrogen peroxide just stated results in lengthening the time required, under otherwise similar conditions, to carry the polymerization reaction to completion. However, by increasing the amount of peroxide, the metal salts may satisfactorily be used in considerably larger proportions. No upper limits to the proportions in which said metal salts may be used have been found.

The polymerization of a vinyl halide with the acidic complex catalyst is advantageously carried out in the presence of a water-miscible organic solvent such as methanol, ethanol, propanol, butanol, acetone, dioxane, etc., or an aqueous solution of such solvent, as a reaction medium. Aqueous methanol of from 70 to 90 per cent by volume concentration is preferred. The medium may be used in any desired proportion, provided that sufficient is employed to co-dissolve the catalyst and the vinyl halide. Usually, aqueous methanol is employed in amount approximately equal to the weight of the vinyl halide to be polymerized. A solution of the vinyl halide, the complex catalyst and the medium may be prepared by admixing the several ingredients in any desired order.

The polymerization of a vinyl halide in the presence of the complex catalyst may be carried out rapidly and completely at temperatures between $-10°$ and $50°$ C. to obtain a colorless polymer having good molding properties and good strength. Higher polymerizing temperatures may be employed if desired. When operating at temperatures below $0°$ C., the reaction may be carried out at atmospheric pressure, but at higher temperatures it is carried out under pressure in a closed vessel. By using the complex catalyst to promote the polymerization, polymers of consistently good quality may be produced.

The following examples describe certain ways in which the principle of the invention has been applied, but are not to be construed as limiting its scope.

EXAMPLE 1

A number of mixtures comprising vinyl chloride and an equal weight of aqueous methanol of 80 per cent by volume concentration were prepared. Certain of these mixtures contained hydrogen peroxide, other contained nitric acid or aluminum chloride, and still others contained all three of these ingredients. In the instances in which nitric acid was present, it was added to the aqueous methanol, in amount sufficient to give the latter a pH value of 1.4, before adding the vinyl chloride or other ingredients. It should be mentioned that the addition of aluminum chloride to such acidified aqueous methanol causes a further lowering of the pH value, in some instances to less than 1. The hydrogen peroxide, when employed, was used in amount corresponding to 0.3 per cent of the weight of the vinyl chloride. The proportion of aluminum chloride was varied in the different experiments. The following table expresses the proportion of aluminum chloride ($AlCl_3$) employed in each experiment both as per cent of the weight of the vinyl chloride reactant and as gram atomic weights of aluminum per gram molecular weight of the vinyl chloride. Each reaction mixture was heated in a closed container at a temperature of $40°$ C. for the time stated in the table, after which each mixture was examined to determine the proportion of the vinyl chloride which had been polymerized. The table indicates whether nitric acid and hydrogen peroxide were used in each experiment, states the proportion of aluminum chloride employed, and gives the per cent of the vinyl chloride which was polymerized. It also gives the polymerization rate as per cent of the vinyl chloride polymerized per hour of heating of the reaction mixture at 40° C.

Table I

| Run No. | HNO₃ Added | H₂O₂ Added | AlCl₃ as: | | Time, Hrs. | Per Cent Polymerization | Polymerization Rate as Per Cent per Hr. |
|---|---|---|---|---|---|---|---|
| | | | Per Cent of the Vinyl Chloride | Gm. Atomic Wt. of Al per Mole of Vinyl Chloride | | | |
| 1 | No | No | 0.553 | 0.0026 | 72 | 0 | 0 |
| 2 | Yes | No | 0.553 | 0.0026 | 72 | 0 | 0 |
| 3 | Yes | Yes | 0 | 0 | 72 | 52.5 | 0.729 |
| 4 | No | Yes | 0.553 | 0.0026 | 24 | 74 | 3.08 |
| 5 | Yes | Yes | 0.055 | 0.00026 | 72 | 68 | 0.944 |
| 6 | Yes | Yes | 0.111 | 0.00052 | 48 | 47 | 1.02 |
| 7 | Yes | Yes | 0.277 | 0.00130 | 48 | 75 | 1.56 |
| 8 | Yes | Yes | 0.553 | 0.0026 | 24 | 65 | 2.7 |
| 9 | Yes | Yes | 0.830 | 0.0039 | 24 | 70 | 2.9 |
| 10 | Yes | Yes | 2.212 | 0.0104 | 24 | 85 | 3.5 |
| 11 | Yes | Yes | 5.530 | 0.026 | 24 | 75 | 3.1 |
| 12 | Yes | Yes | 11.060 | 0.052 | 48 | 50 | 1.04 |

In Table I it will be noted that neither the aluminum chloride alone nor the aluminum chloride together with the acid are as active as catalysts for the polymerization reaction as a mixture of the acid and the peroxide. However, runs 4-12 show that a mixture of aluminum chloride and the peroxide and also mixtures of aluminum chloride, a peroxide and an acid are far more effective as catalysts than is the mixture of acid and peroxide. Run 4 of the table should not be interpreted as meaning that an acid is not required as an ingredient of the complex catalyst. The aluminum chloride is partially hydrolyzed by the water in the aqueous methanol to produce an acid in situ within the reaction mixture, i. e. in run 4, the solution of the aluminum chloride in the aqueous methanol, used as a reaction medium, had a pH value of 2.7. The lower rates of polymerization in runs 5–9, as compared with run 4, was due to the use of too great a proportion of acid. Runs 5–10 show that the rate of polymerization increases with increase in the proportion of the aluminum salt, provided sufficient peroxide is present to co-act catalytically with said salt. Runs 11 and 12 show that the rate of polymerization decreases when the proportion of the aluminum salt is increased above that which will co-act catalytically with the peroxide in the reaction mixture.

EXAMPLE 2

In each of a series of experiments, a reaction mixture was prepared which contained 10 parts by weight of vinyl chloride, 10 parts of aqueous methanol of 85 per cent by volume concentration, and 0.03 part of hydrogen peroxide. In all except one instance, 0.1 part of concentrated nitric acid was also added. In a number of the experiments, chromic chloride in the proportion stated in Table II was added. Each reaction mixture was heated at 40° C. in a closed container for 24 hours, after which the proportion of vinyl chloride which had been polymerized was determined. Table II states for each experiment, whether nitric acid and chromic chloride were employed, gives the proportion of the chromic chloride (CrCl₃.6H₂O) both as per cent of the weight of the vinyl chloride and as gram atomic weights of chromium per gram molecular weight of the vinyl chloride, states the per cent of the vinyl chloride polymerized, and gives the polymerization rate as per cent of the vinyl chloride polymerized per hour of heating at 40° C.

Table II

| Run No. | HNO₃ Added | CrCl₃.6H₂O as: | | Percent Polymerization | Polymerization Rate as Per Cent per Hr. |
|---|---|---|---|---|---|
| | | Percent of the Vinyl Chloride | Gm. Atomic Wts. of Cr Per Gm. Mole of Vinyl Chloride | | |
| 1 | No | 0 | 0 | Trace | |
| 2 | Yes | 0 | 0 | 0 | 0 |
| 3 | Yes | 0.00078 | 0.00094 | 87.5 | 3.64 |
| 4 | Yes | 0.000975 | 0.00117 | 90 | 3.75 |
| 5 | Yes | 0.00156 | 0.00188 | 95 | 3.96 |
| 6 | Yes | 0.00487 | 0.00586 | 90 | 3.75 |
| 7 | Yes | 0.0195 | 0.02344 | 57 | 2.37 |

From Table II it will be seen that neither hydrogen peroxide alone, nor a mixture of the same and nitric acid were satisfactory as catalysts for the polymerization, but that the complex catalyst comprising the peroxide, acid and a chromic salt was highly effective for the purpose. The decrease in polymerization rates in runs 6 and 7 were evidently due to employment of the chromic salt in proportions greater than will co-act catalytically with the amount of peroxide used. When employing such relatively large proportions of a chromic salt, the proportion of the peroxide may advantageously be increased.

Other modes of applying the principle of the invention may be employed instead of those explained, change being made as regards the method herein disclosed, provided the steps or ingredients stated by any of the following claims, or the equivalent of such stated steps or ingredients, be employed.

We therefore particularly point out and distinctly claim as our invention:

1. The method which comprises polymerizing a vinyl halide in the presence of an aqueous inert ionizing solvent as a reaction medium and a small amount of an acidic complex polymerization catalyst containing, as its essential ingredients, a metal salt containing as the positive ion a metal selected from the class consisting of chromium and aluminum, which metal salt is present in amount such as to contain at least 0.0005 gram atomic weight of said metal per gram mole of the material to be polymerized, and a peroxide in amount sufficient to co-act in catalytic manner with said salt, the polymerization mixture as a whole being of a pH value between 1 and 6.

2. The method as described in claim 1 wherein the vinyl halide is vinyl chloride, the solvent is aqueous methanol of from 70 to 90 per cent concentration, the peroxide is hydrogen peroxide and the polymerization mixture as a whole is of a pH value between 1 and 3.

JOSEPH W. BRITTON.
ROBERT C. DOSSER.

REFERENCES CITED

The following references are of record in the file of this patent:

UNITED STATES PATENTS

| Number | Name | Date |
|---|---|---|
| 1,935,733 | Tschunkur | Nov. 21, 1933 |
| 2,100,900 | Fikentscher | Nov. 30, 1937 |
| 2,109,595 | Marks | Mar. 1, 1938 |
| 2,120,933 | Dittmar | June 14, 1938 |
| 2,171,765 | Rohm | Sept. 5, 1939 |
| 2,259,513 | Barnes | Oct. 21, 1941 |
| 2,356,767 | Kropa | Aug. 29, 1944 |

OTHER REFERENCES

Hall Textbook of Quantitative Analysis, page 261, John Wiley & Sons, Inc., N. Y. (1935).

Morrell Synthetic Resin, 2nd edition, Oxford University Press, London (1943) page 188. Copy in Div. 50.

Noyes et al.: Qual. Anal. for the Rare Elements, pages 164, 175. Copy in Div. 59.

Raub: Chem. Abst., 27, 1276 (1933).

Noyes et al.: Qual. Anal. for the Rare Elements, pages 320–321, MacMillan (1927). Copy in Div. 59.

Latimer et al.: Reference Book of Inorganic Chem., pages 92, 93, MacMillan, New York (1940). Copy in Div. 50.

Boblesky: Z. Anorg. Allgem. Chem. 206, 161–170 (1932).